United States Patent [19]
Pearson et al.

[11] Patent Number: 5,604,822
[45] Date of Patent: Feb. 18, 1997

[54] METHODS AND APPARATUS FOR CENTROID BASED OBJECT SEGMENTATION IN OBJECT RECOGNITION-TYPE IMAGE PROCESSING SYSTEM

[75] Inventors: William A. Pearson, Orlando; Richard W. Benton, Altamonte Springs; John D. Lofgren, Orlando, all of Fla.

[73] Assignee: Martin Marietta Corporation, Bethesda, Md.

[21] Appl. No.: 150,829

[22] Filed: Nov. 12, 1993

[51] Int. Cl.⁶ ............................................. G06K 9/48
[52] U.S. Cl. ............................................. 382/199; 382/197
[58] Field of Search .................................. 382/22, 9, 25, 382/16, 103, 197, 199; 342/90

[56] References Cited

U.S. PATENT DOCUMENTS

| | | | |
|---|---|---|---|
| 4,802,230 | 1/1989 | Horowitz | 382/22 |
| 4,901,362 | 2/1990 | Terzian | 382/22 |
| 5,054,094 | 10/1991 | Barski | 382/18 |
| 5,101,440 | 3/1992 | Watanabe et al. | 382/22 |
| 5,103,484 | 4/1992 | Stafford et al. | 382/1 |
| 5,220,621 | 6/1993 | Saitoh | 382/22 |
| 5,245,674 | 9/1993 | Cass et al. | 382/16 |

OTHER PUBLICATIONS

Schalkoff, R. J., "Digital Image Processing and Computer Vision", John Wiley & Sons, Inc., 1989, pp. 257–258.
Myler, H. and Weeks, A., "Computer Imaging Recipes in C", Prentice Hall, 1993, pp. 53–72.

*Primary Examiner*—Jose L. Couso
*Assistant Examiner*—Matthew C. Bella
*Attorney, Agent, or Firm*—Finnegan, Henderson, Farabow, Garrett & Dunner, L.L.P.

[57] ABSTRACT

A digital signal processing system which uses an input image including a plurality of pixels to establish boundaries of objects in the input image. Each of the pixels has a gradient value and the object includes a centroid. Using a segmentation process, the digital signal processing system decides on a perimeter surrounding the object in the input image and then repeatedly searches for a pixel having the highest gradient value and marks that pixel having the highest gradient value as an edge pixel of the object.

11 Claims, 8 Drawing Sheets

GRADIENT IMAGE

SEGMENT IMAGE

THRESHOLD GRADIENT

PASS 1

PASS 2

SEGMENT IMAGE

METHODS AND APPARATUS FOR CENTROID BASED OBJECT SEGMENTATION IN OBJECT RECOGNITION-TYPE IMAGE PROCESSING SYSTEM

FIELD OF THE INVENTION

The present invention relates to an image processing system and, more particularly, to object recognition-type image processing systems. The invention facilitates the segmentation operation for object recognition-type image processing systems.

BACKGROUND OF THE INVENTION

Automatic target recognition-type image processing systems are specialized object recognition-type image processing systems that provide the capability to detect and recognize targets (or objects), and assist with the launch of weapons against targets. As imaging technology has matured, the ability to reduce pilot workload using automatic target recognition-type image processing systems in single-seat, high-performance aircraft has evolved. The same maturation process has resulted in significant improvements in ground-to-air defense systems, and has decreased the time available for a pilot to detect and recognize targets and launch weapons.

A viable approach to minimizing aircraft exposure to enemy fire and to minimizing pilot workload under combat conditions, while maximizing the range within which a pilot can launch weapons, is to employ automatic target recognition technology incorporating the advances in imaging technology in the aircraft. Generally, automatic target recognition processes require six operations. During a first operation, an image sensor (e.g., a charge coupled device) mounted in the aircraft scans an area on the surface of the earth below the aircraft and produces an image of that area. The image is composed of many pixels; the number of pixels is determined by the size of the image sensor.

A second operation is image enhancement, during which the image produced by the sensor is enhanced by eliminating background noise and other non-uniformities in the image. A third operation is called target segmentation. Target segmentation includes identifying pixels of the image that form possible targets (including the edge of each target) and background pixels. This process requires extremely sophisticated segmentation processing (including many calculations) over the entire input image.

During a fourth operation of target detection, targets in the segmented image are detected ("prescreened"). During a fifth operation, features of the image as they relate to the identified targets are extracted from the image. Feature extraction includes the process of extracting certain characteristics of each target in the image (e.g., average gradient over the object perimeter).

Finally, during a sixth operation each target in the image is classified or identifying as being a member of a particular class of targets based upon a given set of target characteristics (e.g., a tank class).

The problem with incorporating conventional automatic target recognition technology in aircraft is that current approaches to target segmentation, detection, and classification involve the use of hardware developed for high-end recognition systems. These high-end recognition systems are large (greater than one cubic foot), making it difficult for them to fit in the limited space typically available in aircraft. These systems are also extremely complicated, and the large number of operations they perform make it difficult for them to complete their operations in the limited time available under combat conditions. Moreover, conventional high-end recognition systems require a great deal of power to operate, and such power generally is not available on the typical aircraft.

Accordingly, alternative automatic target recognition systems have been developed which use compact hardware systems capable of performing the functions of high-end target recognition systems. These compact hardware systems consume less power than is traditionally required by high-end target recognition systems. The size of these compact hardware systems facilitate their use in aircraft. However, these conventional target recognition systems still include the prohibitively large number of operations generally required by conventional high-end target recognition systems. The large number of operations makes it difficult for all operations to be completed within the limited time a pilot has under combat conditions.

SUMMARY OF THE INVENTION

It is therefore an object of the present invention to provide an image processing system capable of performing target recognition within the limited time a pilot has for the system to complete its operations.

It is also an object of the present invention to provide an image processing system with increased processing speed by performing target detection before segmentation and by reducing the operation steps for the segmentation of targets.

It is a further object of the present invention to provide the capability to perform high-end target recognition-type functions in a compact hardware system.

It is yet another object of the present invention to provide a target recognition system in a compact hardware system capable of fitting in the limited space available on aircraft.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a method, performed by a signal processing system, for establishing the boundaries of an object in an input image including a plurality of pixels. Each of the pixels corresponds to a gradient (intensity) value and the object includes a centroid. The signal processing system, using the present invention, decides on a perimeter containing the object in the input image and then repeatedly searches from the centroid of the object to the perimeter, for a pixel having the highest gradient value and marks the pixel having the highest gradient value as an edge pixel of the object.

The present invention also comprises a method, performed in a signal processing system, for determining whether a pixel of an input image corresponds to an object using a plurality of masks. Each of the masks consists of a matrix of bits. The input image includes a plurality of pixels; each pixel having a gradient value. The object includes a centroid. The signal processing system, using the present invention, divides the input image into four quadrants using the centroid, each of the quadrants having a corresponding mask. The system then identifies edge pixels in the input image, each edge pixel corresponding to a gradient value greater than a threshold gradient value and compares the mask for each of the quadrants with a matrix of pixels within the same quadrant. Finally, the system determines, using the edge pixels, whether one of the pixels in the matrix of pixels corresponds to part of the object.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE PREFERRED IMPLEMENTATIONS

Reference will now be made in detail to the preferred implementations of the present invention, examples of which are illustrated in the accompanying drawings. Wherever possible, the same reference numbers will be used throughout the drawings to refer to the same or like parts.

The present invention is preferably implemented by a digital signal processing system or other data processing system. Such a digital signal processing system may be a conventional digital signal processing system. However, the present invention preferably is implemented in the digital signal processing system 100 illustrated in FIG. 1.

Figure 1:
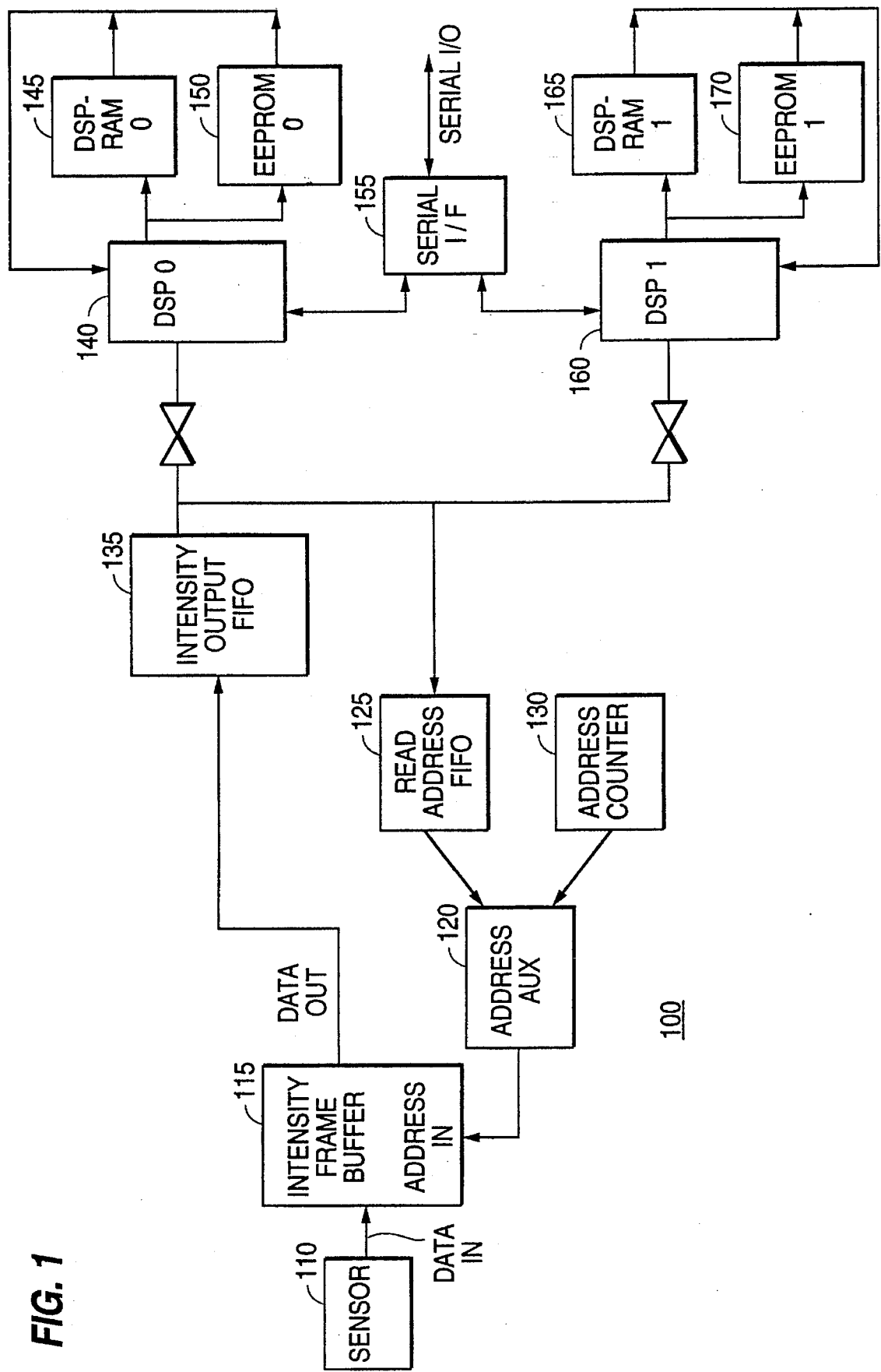
FIG. 1 is a block diagram illustrating the components of an exemplary computer system in which the present invention may be implemented.

Referring to FIG. 1, the digital signal processing system 100 comprises a sensor 110, an intensity frame buffer 115, an address multiplexer (MUX) 120, a read address FIFO 125, an address counter 130, an intensity output FIFO 135, digital signal processors (DSPs) 140 and 160, DSP random access memories (RAMs) 145 and 165, erasable electrical programmable read only memories (EEPROMs) 150 and 170, and a serial interface (I/F) 155. A video subsystem including the sensor 110, the intensity frame buffer 115, the address MUX 120, the read address FIFO 125, and the address counter 130 operates in accordance with timing signals generated by a 9 MHz video clock (not shown). A processor subsystem includes the DSPs 140 and 160, the DSP RAMs 145 and 165, the EEPROMs 150 and 170, and the serial I/F 155 and operates in accordance with timing signals generated by a 30 MHz DSP clock (not shown).

In operation, the sensor 110, e.g., an infrared charge coupled device with pixels arranged 360h×360v, receives an input image and then sends the image including 360 lines of data with 360 pixels per line, to the intensity frame buffer 115.

The intensity frame buffer 115 is a random access memory (RAM), and preferably is capable of holding 360 lines of data with 360 pixels per line (or a total of 129,600 bytes of data). The data in the intensity frame buffer 115 is accessed using an address, or identification of the physical location in the buffer 115, from the address MUX 120.

Continuous video generally consists of thirty distinct images or frames per second. These thirty static images displayed to the human eye one after another give the illusion of continuous motion. Consequently, the intensity frame buffer 115 contains data corresponding to one of these images that is to be processed by the system 100.

The address MUX 120 performs multiplexing functions based on input from the DSP0 140, the DSP1 160, and the address counter 130. In operation, the address MUX 120 allows the buffer 115 to be addressed by either one of the DSP0 140 or the DSP1 160, or by the address counter 130.

The read address FIFO 125 allows two systems, i.e., video and processor subsystems operating at different speeds, to communicate by receiving data at one rate (i.e., the rate for the video subsystem) and outputting the data at another rate (i.e., the rate for the processor subsystem). In operation, the read address FIFO 125 accepts addresses for data stored in the intensity frame buffer 115 that are synchronized with the DSP clock (not shown) and outputs the addresses synchronized with the video clock (not shown). In this manner, the read address FIFO 125 facilitates communication between the intensity frame buffer 115 and the DSP0 140 and DSP1 160. This facilitation is discussed below in more detail.

The address counter 130 is reset (or set to 0) during a video blanking time (between video frames) and counts to provide the next address for each pixel to be written to memory. In operation, the address counter 130 is used to increment an address by one for each new input pixel so that pixels are stored in consecutive memory locations in the intensity frame buffer 115.

Like the read address FIFO 125, the intensity output FIFO 135 is used to facilitate communication between the two subsystems operating at different speeds. In operation, the intensity output FIFO 135 accepts pixels (or data) synchronized with the video clock (not shown) and outputs them synchronized with the DSP clock (not shown).

Figure 3:
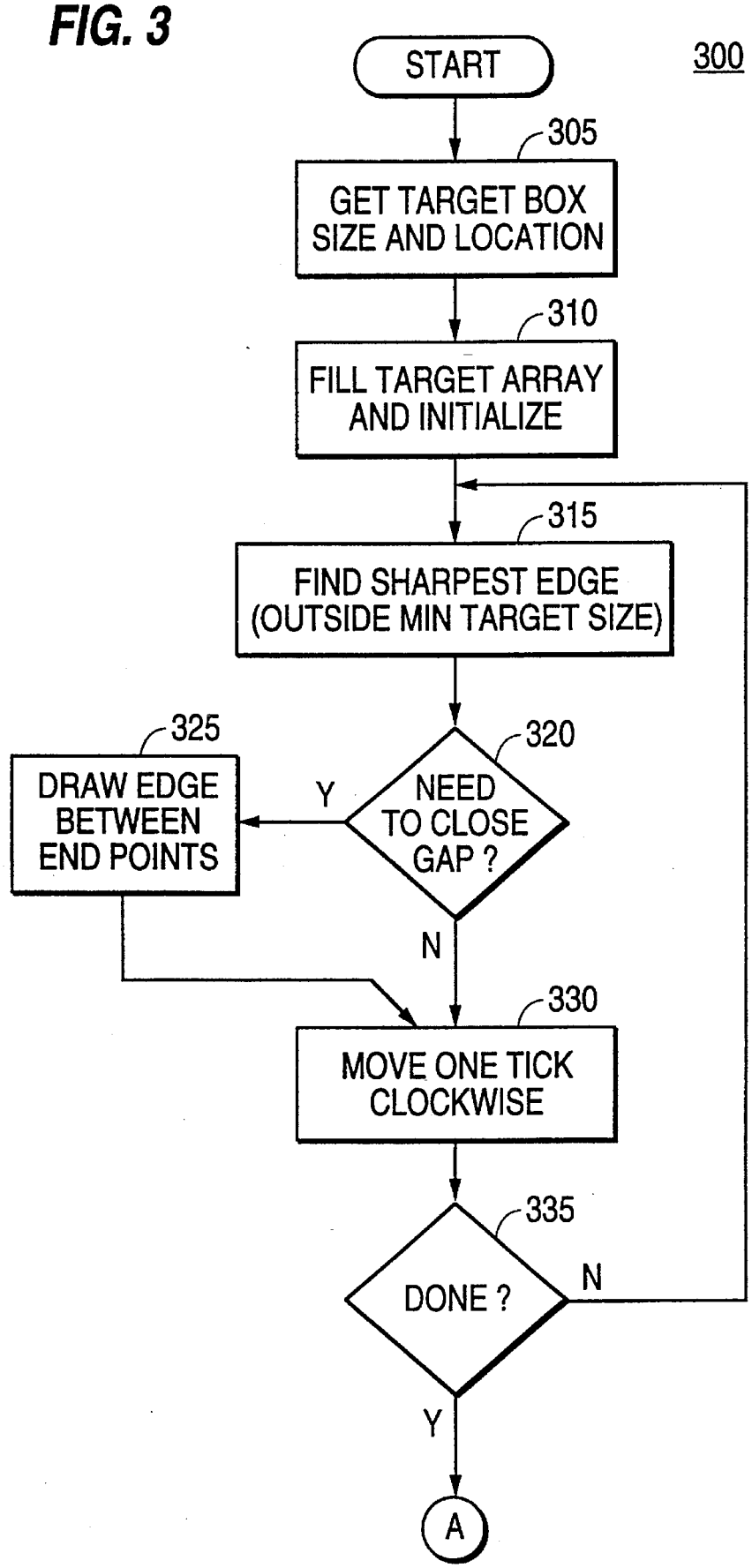
FIG. 3 is a flow diagram for a first preferred method of performing the functions of a segmentation component of FIG. 2.

The digital signal processors DSP0 140 and DSP1 160 are key components in the architecture of the system 100. The DSP0 140 and the DSP1 160 may simultaneously perform the operations of either the SWEEP Procedure 300 (FIGS. 3 and 4) or the MASK Procedure 700 (FIGS. 7 and 8) which will both be described below. The DSP0 140 and the DSP1 160 include internal RAM (not shown). In the system 100, the DSP0 140 and the DSP1 160 are CMOS 32-bit floating-point processors (e.g., TMS320C30 processors manufactured by Texas Instruments of Texas, U.S.A.) with a throughput in excess of 30 million floating-point operations per second (MFLOPS). The main CPU of the DSP0 140 and the DSP1 160 can perform parallel multiplication and arithmetic logic unit operations on integer or floating-point data in a single cycle (60-ns single cycle execution time). The DSP0 140 and the DSP1 160 also include a general-purpose register file, a program cache, dedicated auxiliary register arithmetic units, internal dual-access memories, and one direct memory access (DMA) channel supporting concurrent I/O, which are described below.

The general purpose register file is a group of registers, each register capable of storing a single number. The program cache is a high speed memory generally used for storing program instructions during processor operation. The dedicated auxiliary register arithmetic units perform specific functions, e.g., addressing.

The internal dual-access memories are random access memories, built into each of the DSPs 140 and 160 that can be accessed twice in one instruction cycle, which is the same as two clock cycles. The DMA channel is used to communicate between a direct memory access (DMA) controller, that is also built into each DSP, and can send or receive blocks of data without tying up the main CPU of the DSP.

The DSP0 140 and the DSP1 160 process video signals (consisting of discrete pixels) from the frame buffer 115, and output target (also called "object") reports through the serial I/O port 155. To access the intensity frame buffer 115, either the DSP0 140 or the DSP1 160 writes the desired frame memory address to the read address FIFO 125. Data from the intensity frame buffer 115 is then written to the intensity output FIFO 135. Either the DSP0 140 or the DSP1 160 then accesses the data by reading the intensity output FIFO 135.

The DSP-RAM 145 and the DSP-RAM 165 store computer programs, or instructions to be performed by DSP0 140 and DSP1 160, respectively. The DSP-RAM 145 and the DSP-RAM 165 operate whenever power (not shown) is supplied to the system 100.

The EEPROMs 150 and 170 also store computer programs including operations (also called "instructions") to be performed by the DSP0 140 and the DSP1 160, respectively. While the DSPRAMs 145 and 165 store programs performed by DSP0 140 and DSP1 160 when the system is powered on, the EEPROMS 150 and 170 also store programs to be performed by the DSP0 140 and the DSP1 160 when the system is powered off.

Finally, the serial I/F 155 of the system 100 controls the communication between the DSPs 140 and 160 and a master system processor or general purpose computer (not shown). After each of the DSPs 140 and 160 finishes processing all input target information, the DSPs 140 and 160 send output target information (e.g., target size and position) via the serial I/F 155 to the master system processor (not shown), which may control, e.g., a launching system used to fire missiles at the target.

Figure 2:
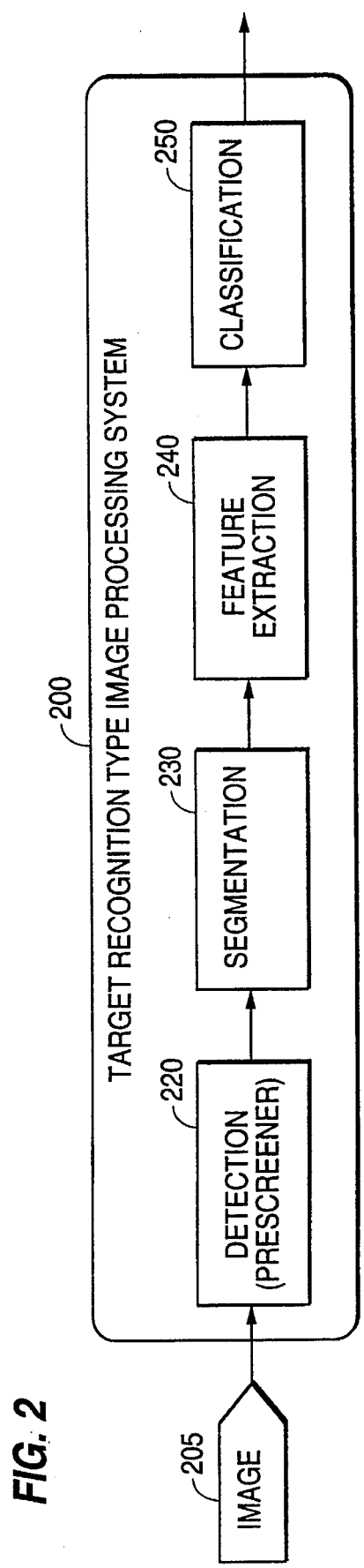
FIG. 2 is a block diagram which illustrates the system components of the preferred implementation of FIG. 1.

Referring now to FIG. 2, the software components of a target recognition-type image processing system according to the present invention will be described. In the present invention, the software components are preferably embodied as programs stored in the DSP-RAM 145 and the DSP-RAM 165 and are executable by the DSP0 140 and the DSP1 160.

The target recognition-type image processing system 200 comprises a detection (prescreener) component 220, a segmentation component 230, a feature extraction component 240, and a classification component 250. During operation of the system 200, component 220 is executed by Separate hardware, for example, the master system processor, under control of the launching system. The required instructions from each of the components 230–250, however, are executed simultaneously by the DSP0 140 and the DSP1 160. In this way the system 100 can quickly perform the variety of target recognition functions of each of the components 220–250.

During operation, the target recognition-type image processing system 200 receives a static image (or frame) 205 from the image sensor 110. The static image provides the image information consisting of multiple lines of image data, including multiple pixels required by the system 200, to identify targets (or objects) in the image using the input target information.

Operation of the system 200 begins when the launching system, using the detection component 220, separates potential objects from background and clutter. This prescreening (or detecting) function tags possible targets while eliminating most of the background and non-target-like objects in the image. Having located targets of interest, the detection component 220 also locates the centroid for each located target. At least one method of performing the prescreening functions is discussed in U.S. patent application Ser. No. 08/035,597, filed Mar. 23, 1993 and entitled Pixel Designator for Small Objects.

Operation of the system 200 continues for components 230–250 when the DSPs 140 and 160 receive, via the serial I/F 155, a command from the external processor, e.g., the processor of a launching system, to process targets. In addition to this "process targets" command, the external processor also sends input target information to the DSPs 140 and 160. The input target information includes a list of target locations and corresponding box sizes of targets in the static image that were obtained using component 220. The target locations are pixel addresses in the static image of the centroid of each possible target in the static image. The box size is an estimated size of each target in the image. For example, target 1 in the image may have a centroid at 16, 18 and a box size of twelve by twelve. In other words, the centroid of target 1 is at the X location 16 and the Y location 18 of the static image and is estimated to be twelve pixels long and twelve pixels wide. The DSPs 140 and 160 can then compute, using this input target information, addresses of the data they require.

Next, the prescreened image including at least one target is input to the segmentation component 230. The image input to the segmentation component 230 is called a gradient image (or edge image), which is an image including pixels having a variety of colors or shades of gray. In general, the segmentation component 230 determines which pixels of the image correspond to each region or object in the image, e.g., background, object, or edge.

Figure 5:
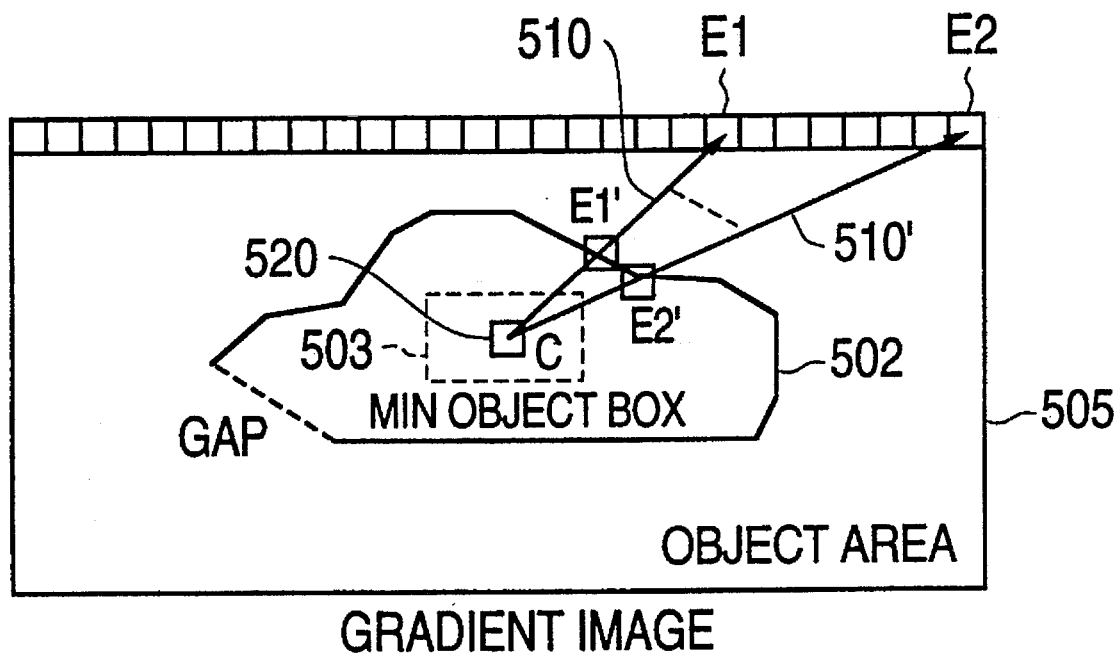
FIG. 5 is an illustration of an object used to explain the first preferred method of performing the functions of a segmentation component of FIG. 2.

Before segmentation, the DSP0 140 (or DSP1 160) inputs the object area, for example, area 505 of FIG. 5, into its internal RAM. In order to get the image area for each target, the DSP0 140 (or DSP1 160) writes the addresses of the data it requires to the read address FIFO 125. The address MUX 120 sends the addresses to the address input of the intensity frame buffer 115. This causes the required data to appear at the output of the frame intensity buffer 115. The data is then passed through the intensity output FIFO 135 to the DSP0 140 (or DSP1 160).

The specific operations of two preferred methods of performing the functions of the segmentation component 230 will be discussed below with reference to FIGS. 3–12.

After segmentation, the segmented image undergoes feature extraction in the feature extraction component 240. The feature extraction component 240 measures specific characteristics of each target in the image. Examples of these characteristics are discussed in "Digital Processing and Computer Vision," Robert J. Schalkoff, John Wiley & Sons, Inc., 1989, pages 257–258. Two example characteristics are the length and the width of the target.

Finally, after feature extraction, each of the objects extracted from the image undergoes classification by the classification component 250. The classification component 250 determines a type or class of each target extracted from the image using previously measured target characteristics obtained from samples of each target class. For example, the characteristics of some sample tanks are calculated and may be stored in the DSP-RAM0 145 so that if the characteristics of a detected object are similar to the stored characteristics of a tank, it will be recognized as a tank. This is done using standard statistical techniques that are not the subject of the present invention.

Referring now to FIGS. 3–6, a first preferred method of performing the functions of the segmentation component 230 will be discussed. The first segmentation method is referred to as the SWEEP procedure 300 and the steps of the SWEEP procedure 300 are illustrated in the flow diagrams of FIGS. 3–4.

As discussed above with reference to FIG. 2, the segmentation component 230 determines whether each pixel of the image 205 corresponds to the background or the object (target) and labels (or identifies) each pixel as an interior object pixel, edge pixel, or background pixel.

Reference will now be made to FIG. 5 to explain, generally, how the SWEEP procedure 300 operates. In FIG. 5 the object 502 is included in an object area 505. The object area 505 is a portion of the gradient image supplied by the detection component 220 to the segmentation component 230.

If a minimum expected object size is known, the SWEEP procedure 300 can be instructed (during initialization) to ignore edges within the minimum object box area 503 around a centroid 520. For example, if the targets of interest are tanks whose minimum aspect from any angle is 3 meters square, then a minimum object box area of something less than 3 meters square may be used. This allows the SWEEP procedure 300 to distinguish outside edges from inside edges of the object. The centroid 520 is substantially the center of the object 502. Finally, the SWEEP procedure 300 may also be programmed with a threshold gradient level or intensity value below which a pixel is not considered an edge. This may result in gaps (e.g., GAP in FIG. 5) in the object perimeter if the object is partially obscured.

The open ends of the perimeter of the object 502 (or the GAP) are connected with a straight line at the conclusion of the SWEEP procedure 300. The pixels along the straight line connecting the GAP are considered edge pixels for the object 502. In other words, if no edge is detected, the last edge found is connected to the next edge found by a straight line to approximate the object edge.

The SWEEP procedure 300 searches along the pixels underneath an imaginary clock (or sweep) hand 510. The imaginary clock hand 510 is fixed at the centroid 520 and rotates 360 degrees over the object area 505. The imaginary clock hand 510 reaches outward from the centroid 520 to an edge E1 of the object area 505. At each imaginary clock hand position, the SWEEP procedure 300 locates the pixel having the maximum gradient value underneath the imaginary clock hand 510, and labels that pixel an edge pixel. For example, for imaginary clock hand position 510 corresponding to edge E1, the pixel with the maximum gradient value underneath the imaginary clock hand 510 is E1'. For the imaginary clock hand position 510' corresponding to edge E2 the pixel with the maximum gradient value underneath the imaginary clock hand position 510' is E2'.

After the clock hand has swept through 360 degrees, the perimeter of the object 502 has been defined. Finally, the SWEEP procedure 300 then labels all interior pixels of the object as interior pixels until encountering an edge pixel that is marked. The SWEEP procedure 300 also labels the centroid pixel C as the centroid to distinguish it from the other interior pixels.

Figure 6:
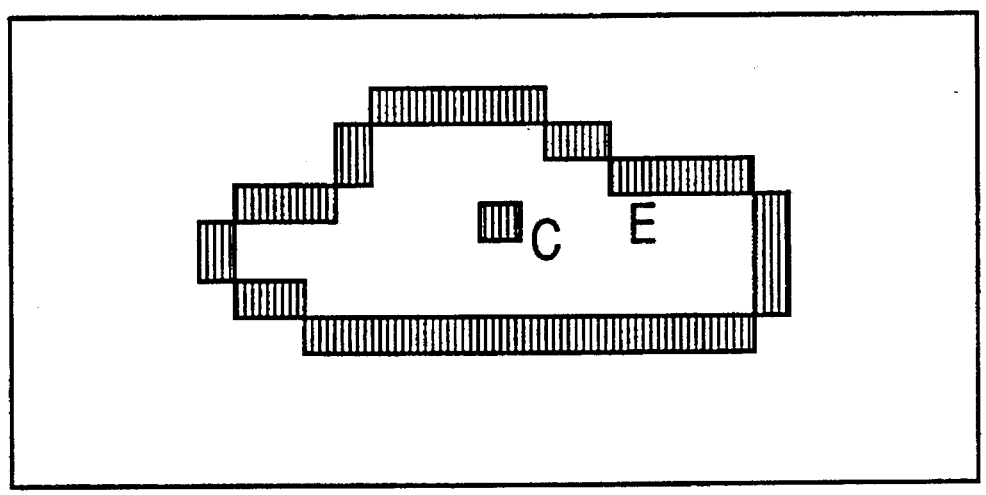
FIG. 6 is an illustration of the object of FIG. 5 after segmentation processing and is used to explain the first preferred method of performing the functions of the segmentation component of FIG. 2.

FIG. 6 illustrates the resultant segmented image produced by the segmentation component 230 using the SWEEP procedure 300 on the object of FIG. 5. In FIG. 6 all of the pixels corresponding to the edges of the target are labelled edge pixels to form the object outline, which may now be referred to as a segment outline, and the centroid C is also labelled. All other interior pixels, within the edge pixels, are labelled interior pixels. For purposes of this explanation, in FIG. 6 these interior pixels are shown as being cleared. It is this segmented object of FIG. 6 that is supplied to the feature extraction component 240 discussed above.

Returning now to FIGS. 3 and 4, the specific steps of the SWEEP procedure 300 will be explained.

First, the DSP0 140 (FIG. 1), executing instructions corresponding to the component 230 (FIG. 2) operating with the SWEEP procedure 300, receives an object (or target) box size (x size and y size) and the location of the centroid of the object in the object box from, for example, the processor of the launch system via the serial I/F 155 (FIG. 1) (Step 305). Next, the component 230 fills an object array by reading image data out of frame memory and into the DSP 140 (or 160) internal memory, and initializes the segment (Step 310).

During initialization (Step 310), the imaginary clock hand (or sweep hand) is fixed at the centroid extending in the 12 o'clock position and a minimum object box 503 (FIG. 5) may be programmed if the distance between the sensor and the object (or the range) is small enough or, equivalently, if the size of the object area is big enough.

After initialization, for each position of the clock hand (beginning at the 12 o'clock position), the DSP0 140 finds the pixel underneath the imaginary clock hand stretching from the centroid to the outer edge of the object area 505 having the highest gradient value that exceeds a preset threshold value (Step 315). This pixel is referred to as the sharpest edge. If a minimum object box 503 has been programmed, the sharpest edge must be located outside of the box 503 (Step 315). Any sharp edges inside the minimum object box 503 are ignored. Any sharp edges (outside the minimum object box 503 if one exists) are labelled edge pixels.

If, after searching the full length of one position of the imaginary clock hand, the DSP0 140 does not find an edge pixel having a gradient value exceeding the threshold gradient value, then this constitutes a GAP in the segment outline. The clock hand continues to sweep (by performing Steps 315, 320, 330, and 335) until the next sharpest edge is found. The GAP is then between the last two edge pixels that have gradient values greater than the threshold.

If it is determined that there is a GAP (see FIG. 5) in the edges of the object that must be closed (Step 320), the DSP0 140 draws an edge between the end points of the GAP thus labelling the pixels of the GAP as edge pixels (Step 325).

Otherwise, the imaginary clock hand 510 of the component 230 moves one "tick" clockwise (Step 330). That is, the DSP0 140 moves the hand of the imaginary clock one position clockwise to the next outer edge pixel of the object 502 in the object area 505.

The DSP0 140, using the component 230 with the SWEEP procedure 300, next determines whether the segmentation processing for locating the edges of the object 502 is completed (Step 335). If the segmentation processing for locating the edges of the object 502 is not complete, the flow returns to step 315 and continues to perform steps 315–335, until the clock hand has rotated 360 degrees.

Figure 4:
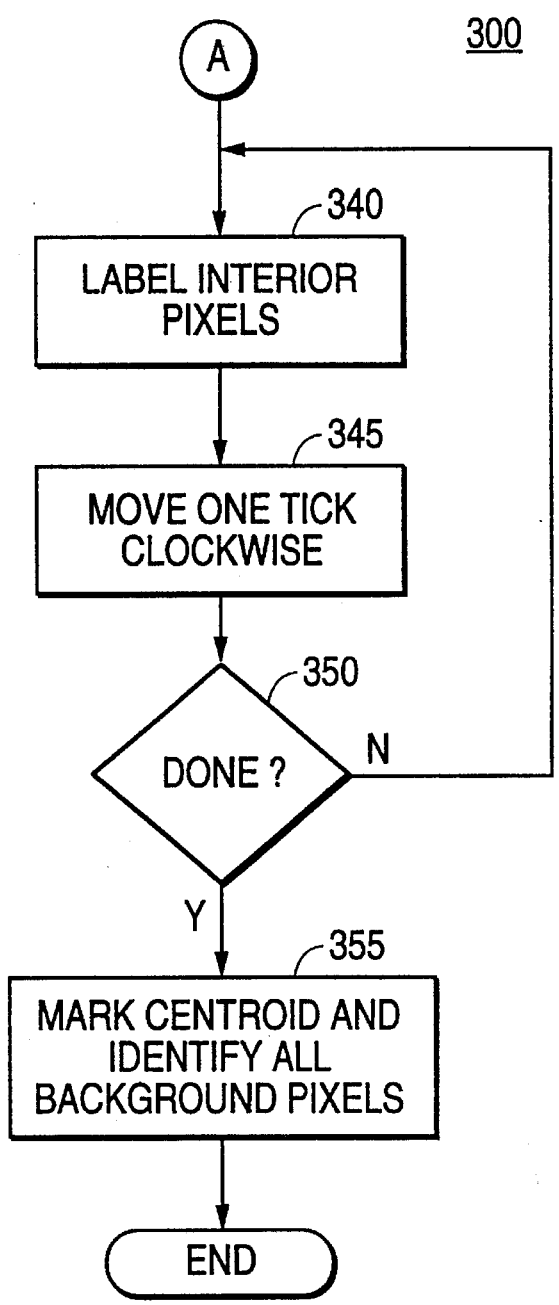
FIG. 4 is a flow diagram for a first preferred method of performing the functions of a segmentation component of FIG. 2.

Once all of the edges of the object 502 have been labelled, the segmentation procedure continues in step 340 of FIG. 4. In step 340, the DSP0 140 begins to label all interior pixels of the object 502 from the centroid to the edges of the object 502 as interior pixels. At each hand position, each pixel along the hand is labeled an interior pixel (from the centroid out) until reaching the marked edge pixel. The component 230 then moves the imaginary clock hand 510 one position clockwise (Step 345) and determines whether there are any additional interior or non-edge pixels of the object 502 that are to be labelled interior pixels (Step 350). If the component 230 has not completed labelling all interior pixels of the object, the flow returns to step 340, and steps 340–350 are performed until all interior pixels have been labelled.

After all edges of the object 502 have been located, the component 230 labels the centroid 520 and identifies all other unlabelled pixels in the object area 505 as background pixels (Step 355), and then the processing of the component 230 is complete.

The discussion above refers to the DSP0 140. However, the DSP1 160 may also be used. Additionally, the system 100 includes both the DSP0 140 and the DSP1 160. Therefore, both DSP0 140 and DSP1 160 may be performing the functions and operations of the SWEEP procedure 300 simultaneously. For example, if multiple targets are detected, both DSP 140 and DSP 160 may operate on separate targets at the same time.

Figure 7:
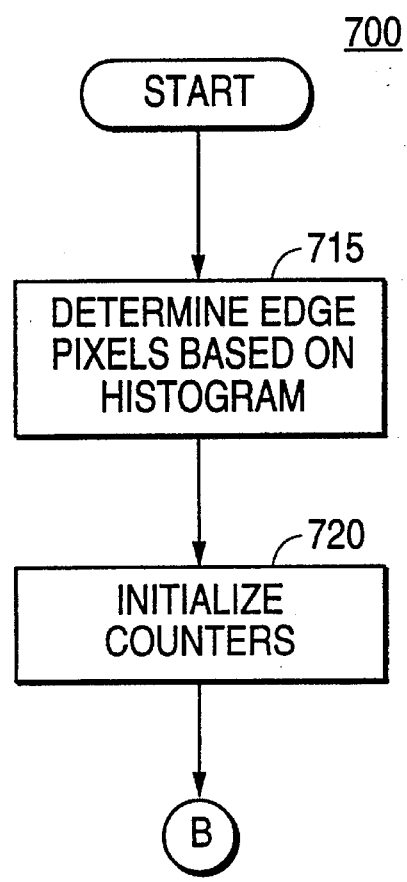
FIG. 7 is a flow diagram for a second preferred method of performing the functions of the segmentation component of FIG. 2.
Figure 8:
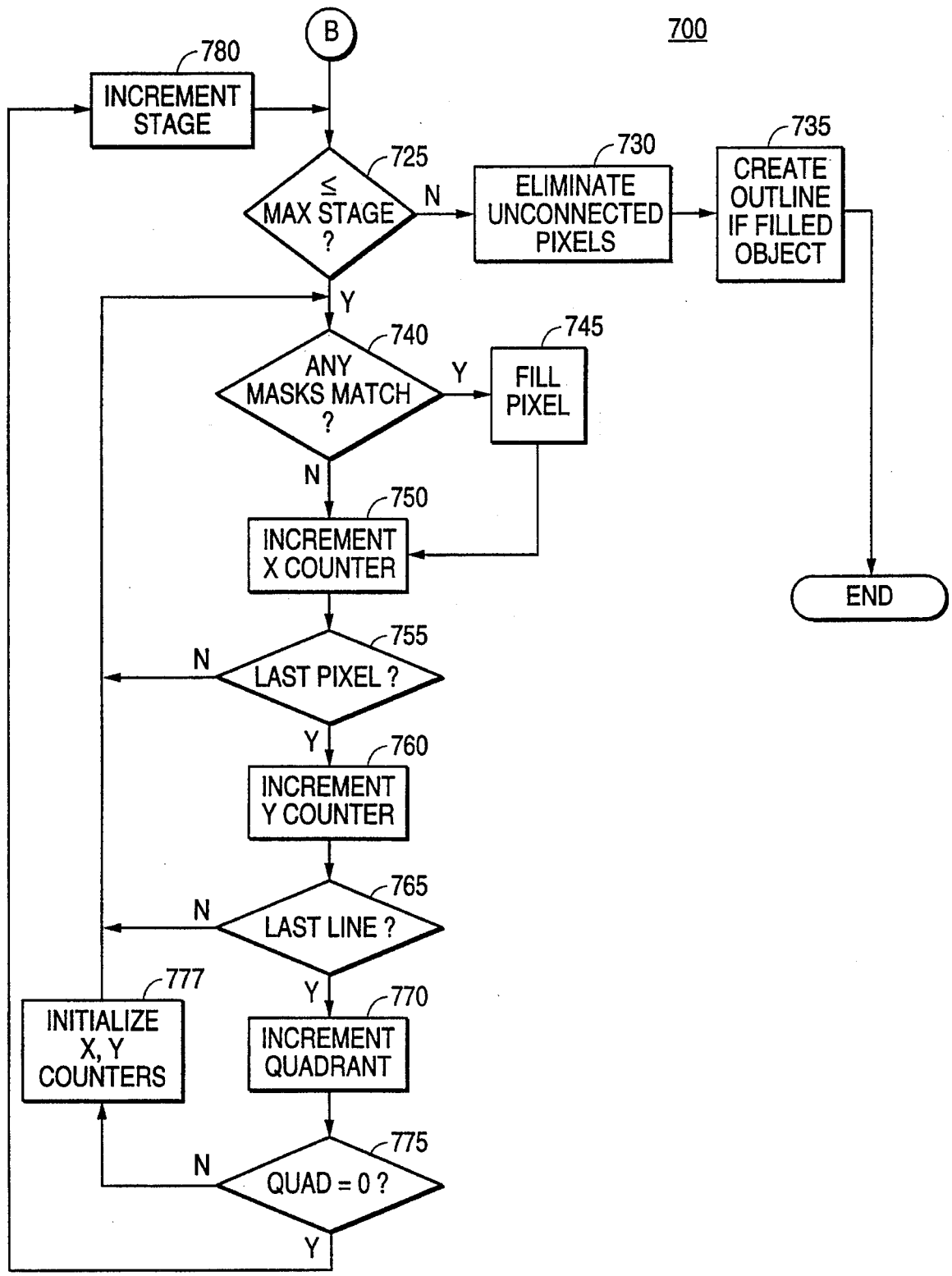
FIG. 8 is a flow diagram for a second preferred method of performing the functions of the segmentation component of FIG. 2.
Figure 9:
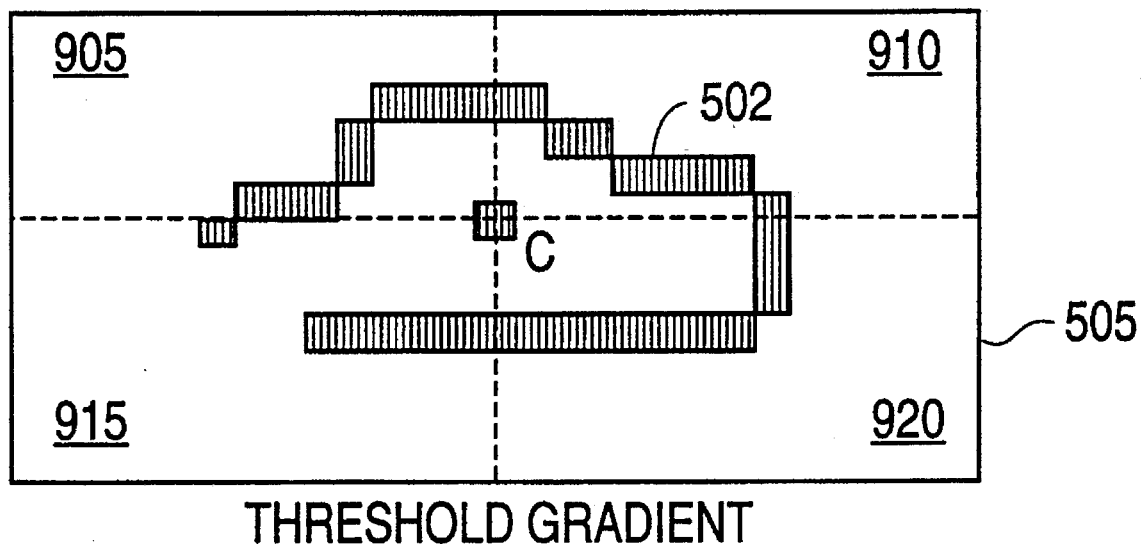
FIG. 9 is an illustration of an object used to explain the second preferred method of performing the functions of the segmentation component of FIG. 2.
Figure 10:
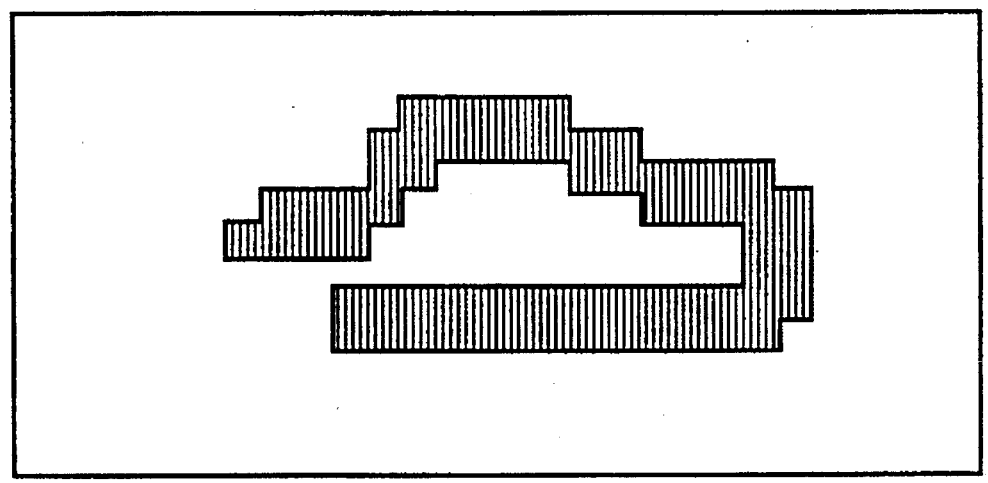
FIG. 10 is an illustration of the object of FIG. 9 during segmentation processing (first pass) and is used to explain the second preferred method of performing the functions of the segmentation component of FIG. 2.
Figure 11:
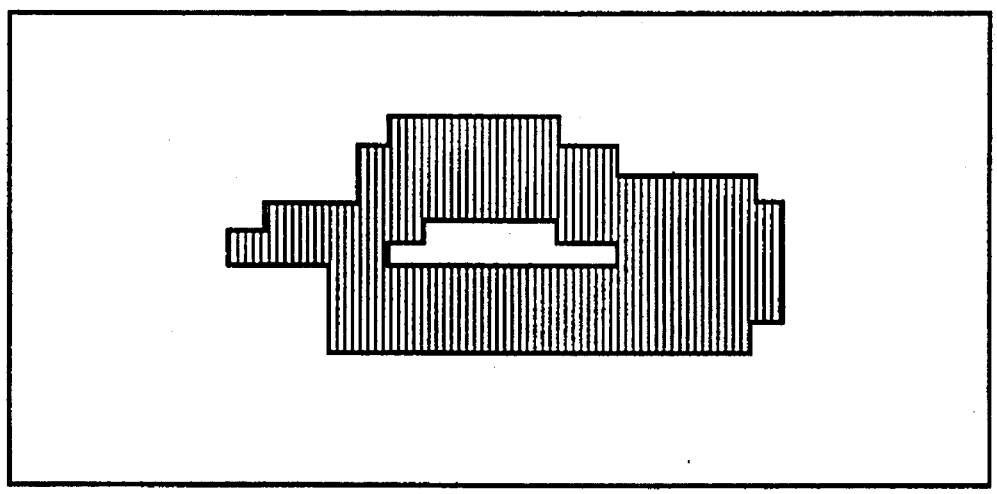
FIG. 11 is an illustration of the object of FIG. 9 during segmentation processing (second pass) and is used to explain the second preferred method of performing the functions of the segmentation component of FIG. 2.
Figure 12:
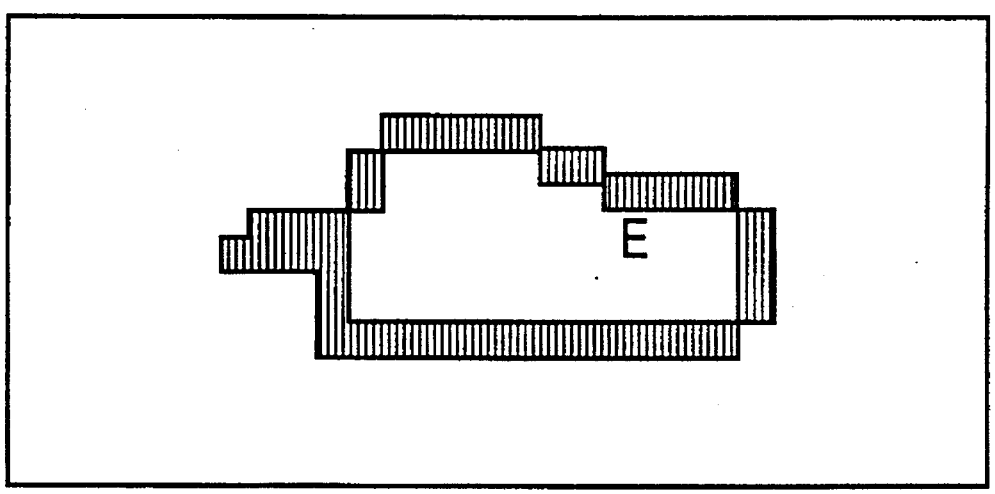
FIG. 12 is an illustration of the object of FIG. 9 after segmentation processing and is used to explain the second preferred method of performing the functions of the segmentation component of FIG. 2.

Referring now to FIGS. 7–12, a second preferred method of performing the functions of the segmentation component 230 will be discussed. The second method is the MASK procedure 700 illustrated in FIGS. 7–8. FIGS. 9–11 illustrate results of the steps of FIGS. 7–8 after a first and second pass. FIG. 12 illustrates a final segmented object.

In general, the DSP0 140 (or the DSP1 160) using the component 230 with the MASK procedure 700, segments an object area, e.g., area 505 (FIG. 9), into interior object pixels, edge pixels, and background pixels. The described method is based on the assumption that a centroid C (FIG. 9) has been found by element 220 and that the centroid is inside the object.

A preset threshold value is used to eliminate all but strong edges, which are pixels having a gradient value that exceeds a predetermined threshold gradient or intensity value. Pixels of area 505 (FIG. 9) with gradient values above the threshold value are set to a one (1) and those with values below the threshold value are set to a zero (0). The DSP0 140 (or the DSP1 160) performing instructions corresponding to the segmentation component 230 with the MASK procedure 700, divides the object area 505 into four quadrants 905, 910, 915, and 920. Each of the quadrants 905–920 has a corner on the centroid C. In each quadrant 905–920 pixels are filled in from an edge pixel (or from the pixel having the highest gradient value) toward the centroid C.

One pass consists of masks being convolved (or passed) over the target area. Each pass fills a one pixel wide outline inside the object perimeter. Convolution is a standard image processing technique. However, the term "convolution" usually connotes a sum of the products of each term rather than a logical "and" of each term. Accordingly, the term "pass" is used herein instead of "convolution". During a pass, if the logical AND of a mask and eight corresponding pixels surrounding the pixel being operated on is "1" (or TRUE), then the pixel is filled. Otherwise it is unchanged.

The number of passes (or stages) required is approximately one-half the number of pixels in the largest expected target because each pass fills one pixel deeper and the target must be filled from edge to center. If, for example, the expected target size is 10 pixels wide, then ½×10 or 5 passes would be required. Since the range (distance between the sensor 110 and the target) is known and the expected size of the actual target is also known, the expected target size in pixels is calculated as follows:

$$\text{pix} = (\arctan(\text{tsize}/\text{range}) \times \text{totalpix})/\text{FOV} \tag{1}$$

In equation (1), "pix" is the expected target size in pixels, "arctan()" is the inverse tangent function in degrees, "tsize" is the actual target size in meters (longest dimension), "range" is the range to the target in meters, "totalpix" is the number of pixels in the sensor image (horizontally), and "FOV" is the sensor field of view in degrees (angle between left and right edge of the sensor image).

A mask preferably is a three by three matrix. In other words, the mask consists of three bits horizontally and three bits vertically. A different mask set is stored in, for example, DSP-RAM0 145, for use with each quadrant. In operation, the mask sets for each quadrant are compared against a matrix of pixels from a portion of the image in the respective quadrant, which is also the same size (horizontally and vertically) as the mask.

In FIG. 9, in the upper left quadrant 905, a mask set is used which locates pixels below and to right of an edge or any already filled area. The mask is generated empirically based, for example, on the idea that, for the upper left quadrant, if an interior pixel or edge exists above or to the left of a pixel then the pixel is an interior pixel. Therefore the masks for the upper left quadrant 905 shown below have 1's to the upper left.

| |1 | X | X| |1 | 1 | X| |1 | 1 | 1| |X | 1 | 1| |
|---|---|---|---|---|---|---|---|---|---|---|---|
| |1 | 0 | X| |1 | 0 | X| |X | 0 | X| |1 | 0 | X| |
| |1 | X | X| |X | X | X| |X | X | X| |1 | 1 | X| |
| MASK 1 | | | MASK 2 | | | MASK 3 | | | MASK 4 | | |

The mask set used for the upper right quadrant 910 is shown below.

| |1| |X|X| |X|1| |1|1| |X|
|X|0|X|X|0| |X|0| |X|0| |
|X|X|X|X|X| |X|X|X|X|X| |
|MASK 1|||MASK 2|||MASK 3|||MASK 4|||

The mask set used for the lower left quadrant 915 is shown below.

|X|X|X|X|X|X|1|X|X|1|X|X|
|X|0|X|1|0|X|1|0|X|1|0|X|
|1|1|1|1|1|X|X|1|1|1|X|X|
|MASK 1|||MASK 2|||MASK 3|||MASK 4|||

The mask set used for the lower right quadrant 920 is shown below.

|X|X|1|X|X|X|X|X|X|X|X|1|
|X|0|1|X|0|1|X|0|X|X|0|1|
|X|X|1|X|1|1|1|1|1|1|1|X|
|MASK 1|||MASK 2|||MASK 3|||MASK 4|||

A pixel is filled if the 1's in the mask all correspond to 1's in the image 502. The DSP0 140 (or the DSP1 160) using the segmentation component 230 operating with the MASK procedure 700, is very tolerant of breaks in the object outline and does not require edge thinning. In other words, if there is a break in the outline of the object, the only result after segmentation is a pie shaped cut-out from the segment. This is illustrated in the lower left hand corner of the object in the segment image of FIG. 12.

Referring now to FIGS. 7–8 the MASK procedure 700 will now be described.

First, the DSP0 140 (or the DSP1 160) performing instructions corresponding to the segmentation component 230 with the MASK procedure 700 identifies edge pixels in the image based on a histogram used to determine a threshold gradient value. All pixels in the gradient image whose value exceeds the threshold are identified as edge pixels (Step 715). Examples of histograms used for this purpose are generally explained in H. Myler and A. Weeks, Computer Imaging Recipes in C, Prentice Hall, pp. 53–72, 1993.

After the edge pixels are identified, the component 230 initializes the X, Y counter, stage (or pass) counter, and quadrant counters (Step 720).

The MASK procedure 700 continues in step 725 of FIG. 8. In step 725, the DSP0 140 (or the DSP1 160) determines whether the stage counter is less than or equal to the maximum number of stages. The maximum stage, as explained previously, is approximately half the maximum expected target size. If not, component 230 eliminates certain pixels (Step 730), called unconnected pixels and creates an outline of the filled object (step 785). The MASK procedure 700 is then complete. An unconnected pixel is one that is filled in, but does not border on another filled pixel. For example, the pixels directly to the right, left, top, and bottom of an unconnected pixel are not filled. Thus, there would be no direct path from an unconnected pixel to the centroid of the target.

Otherwise, when it is determined that the stage counter is less than or equal to the maximum stage (Step 725), the DSP0 140 (or the DSP1 160) next determines whether any masks match (Step 740). In other words, whether the AND of the mask and the eight corresponding pixels surrounding the pixel being operated on is a "1" (or TRUE), in which case the DSP0 140 (or the DSP1 160) fills in the pixel being operated upon (Step 745). The pixel that gets filled is the pixel that the mask is centered over. Otherwise, or after the pixel is filled in Step 745, an X counter is incremented by one (Step 750).

The DSP0 140 (or the DSP1 160) then determines whether the X counter is equal to a maximum X value that indicates the right edge of the quadrant has been reached (Step 755). If the last pixel in the line has not been considered (Step 755), flow returns to step 740. Otherwise, the Y counter is incremented by one (Step 760).

It is then determined by the DSP0 140 (or the DSP1 160) whether the last line has been reached (Step 765). If not, the Y loop has not been completed and the component 230 returns to step 740 to perform the X loop for the current line. Otherwise, a quadrant counter is incremented (Step 770). The quadrant counter is preferably incremented modulo 4 so it wraps around to zero after four quadrants (0–3) have been processed.

The X and Y loops cover all the pixels in a quadrant. At each pixel every mask (for that quadrant) is evaluated and if a mask matches, the pixel is filled. The quadrant loop covers all four quadrants. The stage loop performs the whole process for multiple stages.

The DSP0 140 (or the DSP1 160) then determines whether the quadrant counter is equal to zero (Step 775). If yes, the stage counter is incremented (Step 780) and flow continues with step 725. If the quadrant counter does not equal zero, the X and Y counters are reinitialized (Step 777) and then flow continues with step 740. There can be only four quadrants for every image.

FIG. 10 illustrates the input image after a first pass and FIG. 11 illustrates the image after a second pass. The MASK procedure 700 passes over the image until the maximum number of stages is reached, that is, until a complete outside boundary of the target is formed as it is in FIG. 11. Then, in step 785, an outline (formed by edges) of the filled object is created by distinguishing between the interior and edge pixels, for example, by labelling all interior pixels as interior pixels and all edge pixels as edge pixels. All other unlabelled pixels are identified as background pixels of the object area 505. The outline together with the interior pixels represents the segment. This segment is passed to the feature extraction function 240. FIG. 12 illustrates the segmented image after the MASK procedure 700 is completed.

Placing segmentation after detection has definite advantages in both segmentation quality and processing requirements. Some of these advantages have been demonstrated with the practical segmentation procedures SWEEP 300 and MASK 700. Segmentation quality is improved if the object is already detected because a seed point, referred to as the centroid, to start the segmentation process is known. If detection is not done before segmentation, then multiple random seed points must be used to accomplish the segmentation. This generally results in inferior segmentation.

Additionally, processing is greatly reduced if detection is done before segmentation because processing can be limited to only the area around the centroid Otherwise the whole image must be segmented. Both procedures 300 and 700 produce object segments whose shapes closely match the shape of the actual object because they are based on a gradient image. The procedures 300 and 700 work well even on difficult scene conditions and are less computationally intensive than segmentation that operates on the entire image. This advantage occurs because the present invention processes a small area in the image (the target box) of perhaps 1000 pixels, which takes much less time than processing the entire image, which might include hundreds of thousands of pixels.

It will be apparent to those of ordinary skill in the art that various modifications and variations can be made in the above-described methods without departing from the scope or spirit of the invention. For example, other criteria besides the maximum gradient may be used to identify edges in methods 300 and 700. Examples include the gradient direction and the gradient position relative to other identified edges.

Other implementations of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of establishing the boundaries of an object in an input image including a plurality of image pixels having gradient values predetermined gray scale, wherein the object includes a centroid, the method, performed by a signal processing system, comprising the steps of:

deciding on a perimeter surrounding the object in the input image;

repeatedly searching, from an image pixel corresponding to the centroid of the object to image pixels of the perimeter, for an image pixel having a highest gradient value of the gradient values of the searched pixels;

marking, as an edge pixel, the image pixel having the highest gradient value for each of the repeated searches when said highest gradient value exceeds a predetermined threshold; and locating and connecting gaps, if any are located between marked edge pixels.

2. A method of determining whether a pixel of an input image corresponds to part of an object, wherein the input image includes a plurality of image pixels having gradient values of a predetermined gray scale, wherein the object includes a centroid, the method, performed by a signal processing system, comprising the steps of;

deciding on a perimeter surrounding the object in the input image;

deciding on a minimum object area of the input image around a pixel of the input image corresponding to the centroid;

repeatedly searching, along a sweep hand extending from the pixel corresponding to the centroid of the object to the perimeter, for an image pixel having a highest gradient value of the gradient values of the searched pixels;

marking, as an edge pixel, the image pixel having the highest gradient value for each of the repeated searches when said highest gradient value exceeds a predetermined threshold and provided the image pixel is outside the minimum object area: and locating and connecting gaps, if any are located between marked edge pixels.

3. A method of determining whether a pixel of an input image corresponds to part of an object, wherein the input image includes a plurality of pixels, each of the pixels having a gradient value of a predetermined gray scale, and wherein the object includes a centroid, the method, performed by a signal processing system, comprising the steps of:

receiving the input image and a location of a pixel corresponding to the centroid of the object within the input image;

sweeping an imaginary clock hand fixed an the location of the pixel corresponding to the centroid of the object around the input image to locate a pixel underneath each position of the imaginary clock hand that has a highest gradient value of the gradient values of the pixels underneath each position of the imaginary clock hand;

marking, as an edge pixel, the pixel having the highest gradient value for each position of the imaginary clock hand when said highest gradient value exceeds a predetermined threshold; and locating and connecting gaps, if any are located between marked edge pixels.

4. The method of claim 3 further including the step of:

denoting a minimum object box, wherein the sweeping step locates the edge pixel outside the minimum object box.

5. An image processing system for establishing the boundaries of an object in an input image including a plurality of image pixels having gradient values of a predetermined gray scale, wherein the object includes a centroid, the system comprising:

means for deciding on a perimeter surrounding the object in the input image;

means for repeatedly searching, from an image pixel in the input image corresponding to the centroid of the object to image pixels of the perimeter, for an image pixel having a highest gradient value of the gradient values of the searched pixels;

means for marking, as an edge pixel, the image pixel, having the highest gradient value for each of the repeated searches when said highest gradient value exceeds a predetermined threshold; and means for locating and for connecting gaps, if any are located between marked edge pixels.

6. An image processing system for determining whether a pixel of an input image corresponds to part of an object, wherein the input image includes a plurality of image pixels, each having a gradient value of a predetermined gray scale, and wherein the object includes a centroid, the system comprising:

means for deciding on a perimeter surrounding the object in the input image;

means for deciding a minimum object area of the input image around a pixel of the image corresponding to the centroid;

means for repeatedly searching, along a sweep hand extending from the pixel corresponding to the centroid of the object to the perimeter, for an image pixel having a highest gradient value of the gradient values of the search pixels;

means for marking as edge pixel, the image pixel having the highest gradient value for each of the repeated searches when said highest gradient value exceeds a predetermined threshold and provided that image pixel is outside the minimum object area; and means for locating and for connecting gaps, if any are located between marked edge pixels.

7. An image processing system for determining whether a pixel of an input image corresponds to part of an object, wherein the input image includes a plurality of pixels, each of the pixels having a gradient value of a predetermined gray scale, and wherein the object includes a centroid, the system comprising:

receiving means for receiving the input image and a location of a pixel corresponding to the centroid of the object within the input image;

sweeping means for sweeping an imaginary clock hand fixed at the location of the pixel corresponding to the centroid of the object around the input image to locate a pixel underneath each position of the imaginary clock hand that has a highest gradient value of the gradient values of the pixels underneath each position of the imaginary clock hand;

means for marking, as an edge pixel, the pixel having the highest gradient value for each position of the imaginary clock hand when said highest gradient value exceeds a predetermined threshold; and means for locating and for connecting gaps, if any are located between marked edge pixels.

8. The system of claim 7 further including:

means for denoting a minimum object box, wherein the sweeping means locates the edge pixel outside the minimum object box.

9. A method of establishing a perimeter of an object in an input image including a plurality of pixels having gradient values of a predetermined gray scale, wherein a subset of the pixels establishes a boundary of the input image and each of the pixels has a gradient value, and wherein one of the pixels identifies a centroid of the object, the method, performed by a signal processing system comprising the steps of:

receiving data identifying a minimum object pixel subset of the pixels within both the pixels of the boundary input image and the pixels of the image that correspond to the object;

repeatedly scanning the pixels outside the pixels of the minimum object pixel subset but within the pixels of the boundary of the input image to identify high-gradient pixels having a gradient value that exceed a predetermined threshold level;

marking the identified high-gradient pixels as edge pixels; and locating and connecting gaps, if any are located between marked sage pixels.

10. An image processing system for establishing a perimeter of an object in an input image including a plurality of pixels having gradient values of a predetermined gray scale, wherein a subset of the pixels establishes a boundary of the input image and each of the pixels has a gradient value, and wherein one of the pixels identifies a centroid of the object the system comprising:

means for receiving data identifying a minimum object pixel subset of the pixels within both the pixels of the boundary input image and the pixels of the image that correspond to the object;

means for repeatedly scanning the pixels outside the pixels of the minimum object pixel subset but within the pixels of the boundary of the input image to identify high-gradient pixels having a gradient value that exceed a predetermined threshold level;

means for marking the identified high-gradient pixels as edge pixels; and means for locating and for connecting gaps, if any are located between marked edge pixels.

11. A method of determining whether a pixel of an input image corresponds to part of an object, wherein the input image includes a plurality of pixels, each of the pixels having a gradient value, and wherein the object includes a centroid, the method, performed by a signal processing system, comprising the steps of:

receiving the input image and a location of the centroid within the input image;

fixing an imaginary clock hand fixed at the location of the centroid;

sweeping, beginning at a first position, the imaginary clock hand clockwise or counterclockwise around the input image to locate a pixel underneath each position of the imaginary clock hand that has a highest gradient value;

determining whether the highest gradient value exceeds a predetermined threshold gradient value; and marking the pixel having the highest gradient value that exceeds the predetermined threshold gradient value as an edge pixel;

repeatedly performing the sweeping step, the determining step, and the marking step on successive positions of the imaginary clock hand until reaching the first position; and locating and connecting gaps, if any are located between marked edge pixels.

* * * * *

UNITED STATES PATENT AND TRADEMARK OFFICE
CERTIFICATE OF CORRECTION

PATENT NO. : 5,604,822

DATED : February 18, 1997

INVENTOR(S) : William A. Pearson et al.

It is certified that error appears in the above-indentified patent and that said Letters Patent is hereby corrected as shown below:

Claim 3, col. 14, line 1, change "an" to --at--.

Claim 9, col. 15, line 38, change "sage" to --edge--.

Signed and Sealed this

Fifteenth Day of April, 1997

*Attest:*

BRUCE LEHMAN

*Attesting Officer*   *Commissioner of Patents and Trademarks*